United States Patent Office 3,419,541
Patented Dec. 31, 1968

3,419,541
PROCESS FOR PREPARING MONOAZO
DYESTUFFS
Rudolf Kühne and Fritz Meininger, Frankfurt am Main,
Germany, assignors to Farbwerke Hoechst Aktiengesellschaft vormals Meister Lucius & Brüning, Frankfurt
am Main, Germany, a corporation of Germany
No Drawing. Continuation-in-part of application Ser. No.
256,247, Feb. 5, 1963. This application July 28, 1964,
Ser. No. 385,772
Claims priority, application Germany, Feb. 8, 1962,
F 35,973
The portion of the term of the patent subsequent to
Feb. 8, 1983, has been disclaimed
3 Claims. (Cl. 260—162)

ABSTRACT OF THE DISCLOSURE

Process for the manufacture of reactive monoazo dyestuffs containing as reactive groupings at least one of the groupings $$-\underset{R_1}{\overset{|}{N}}-SO_2-CH_2-\underset{R_2}{\overset{|}{C}H}-O-SO_3H$$

$$-\underset{R_1}{\overset{|}{N}}-SO_2-CH_2-\underset{R_2}{\overset{|}{C}H}-Cl$$

or $$-\underset{R_1}{\overset{|}{N}}-SO_2-CH=CH-R_2$$

in which $R_1$ represents lower alkyl or benzyl, $R_2$ represents hydrogen or lower alkyl, wherein monoazo dyestuffs in which $R_1$ is hydrogen are reacted with an alkylating agent. The dyestuffs obtained thereby are suitable for the dyeing or printing of cellulose, protein, polyamide and polyurethane fibers.

---

This application is a continuation-in-part of our copending application, Ser. No. 256,247, filed Feb. 5, 1963, and since abandoned.

The present invention relates to monoazo-dyestuffs containing N-alkylated ethionylamino, β-chloro-ethanesulfonyl-amino or vinylsulfonylamino groups and to a process for their manufacture.

It has been found that monoazo-dyestuffs containing N - alkylated ethionylamino, β - chloro-ethane-sulfonylamino or vinylsulfonylamino groups which, in the free acid form, having one of the following general formulae

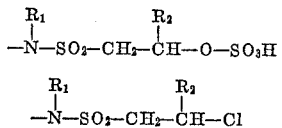

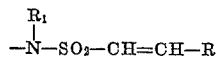

and

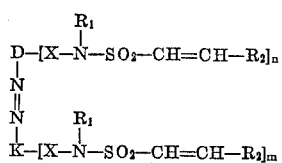

wherein D represents a mono- or binuclear aryl radical, for example a radical of the benzene, naphthalene or diphenyl ether series, which may be substituted, in particular, by sulfonic acid groups, e.g., phenyl, chlorophenyl, lower alkyl phenyl, di-lower alkyl phenyl, lower alkoxy phenyl, lower alkoxy sulfophenyl, trifluoromethyl phenyl, carboxyphenyl, sulfophenyl, disulfophenyl, acetylamino sulfophenyl, naphthyl, K represents the radical of a coupling component, for instance of the benzene, naphthalene or pyrazolone series or of the acetoacetic acid, e.g., hydroxynaphthyl, sulfohydroxynaphthyl, disulfohydroxynaphthyl, disulfoamino naphthyl, acetylamino hydroxynaphthyl, acetylamino sulfohydroxynaphthyl, acetylamino disulfohydroxynaphthyl, lower alkylamino hydroxynaphthyl, acetoacetylaminophenyl or 1 - chloro-sulfophenyl-lower alkyl-5-pyrazolone, X stands for a direct linkage or one of the groupings

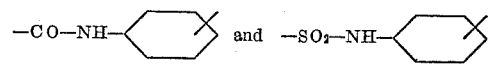

$R_1$ represents a lower alkyl group or an aralkyl group, $R_2$ represents a hydrogen atom or a lower alkyl group, and $n$ and $m$ stands for 0, 1 or 2, the sum of $n+m$ being 1 or 2, can be prepared by reacting monoazo-dyestuffs having one of the following general formulae

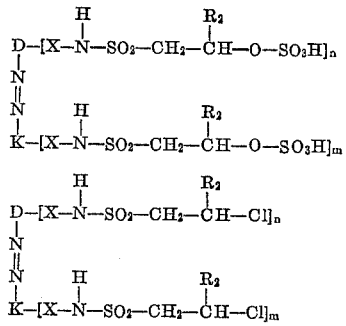

and

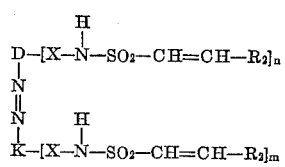

wherein D, K, X, $R_2$, $n$ and $m$ are as defined above, with alkylating agents in an aqueous medium in the presence of an acid-binding agent.

The monoazo-dyestuffs which, in the process of the present invention, may be used as starting materials may be prepared in known manner by coupling any diazo component of the benzene, napthalene or diphenylether series with any coupling component, whereby the diazo and/or the coupling components are elected in a manner that the ready dyestuffs contain in the diazo or in the coupling component or in both components at least once an ethionylamino, β-chloro-ethanesulfonylamino or vinylsulfonylamino group.

When carrying out the process of the present invention, the dyestuffs used as starting material are dissolved in water or, in case they are sparingly soluble or insoluble in water, suspended therein in a finely divided form, and reacted at a temperature of between about 30° C. and about 130° C. in the presence of an acid-binding agent in the neutral or weakly alkaline range with an alkylating agent, while vigorously stirring.

As alkylating agents there may be used alkyl halides, such as methyl and ethyl bromide, or aralkyl halides, such as benzyl chloride, or dialkyl sulfates, such as dimethyl sulfate and diethyl sulfate.

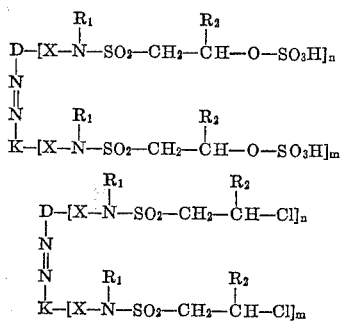

As acid-binding agents there may be used alkali metal or alkaline earth metal hydroxides, borates, phosphates or acetates, especially alkali metal or alkaline earth metal. carbonates or hydrogen carbonates, such as potassium hydrogen carbonate, sodium carbonate or calcium carbonate.

The monoazo-dyestuffs containing N-alkyl-vinylsulfonylamino groups can also be prepared directly from the dyestuffs used as starting material which contains N-ethionylamino or β-chloro-ethane-sulfonylamino groups. The preparation of the monoazo-dyestuffs containing N-alkyl-vinylsulfonylamino groups may be carried out, for example, by reacting the dyestuffs used as starting material which contain N-ethionylamino or β-chloro-ethane-sulfonylamino groups at a pH-value of between about 8.5 and 10 with dialkyl sulfate. If desired, monoazo-dyestuffs containing N-alkyl-ethionylamino or N-alkyl-β-chloro-ethane-sulfonylamino groups prepared according to the process of the present invention may also be transformed into the products of the present process containing N-alkyl-vinylsulfonylamino groups of a subsequent treatment with an acid-binding agent.

The monoazo-dyestuffs obtainable by the process of the present invention are suitable for dyeing and printing natural or regenerated protein fibers, such as wool and silk, furthermore, polyamide and polyurethane fibers, and especially native and regenerated cellulose material, such as cotton, linen, staple fiber or artificial silk. The dyeing and printing of cellulose fibers is carried out advantageously by treating the material with an aqueous solution of the dyestuff at normal or elevated temperature in the presence of an acid-binding agent or by printing with a printing paste in the presence of an acid-binding agent and by subsequently heating and steaming the material.

The monoazo-dyestuffs obtainable by the process of the present invention, in practice, possess advantages over the dyestuffs used as starting material. When dyeing cotton according to the direct dyeing method or the so-called padbatch method or when printing cotton, better results, especially a higher proportion of dyestuff fixed on the fibrous material, are obtained, comparing the dyestuffs used as starting material with the products obtained in the process of the present invention. As a rule, the dyestuffs yield pure dyeings and prints distinguished by good fastness properties, more particularly, by a good to very good fastness to light and a very good fastness to wet processing.

The following examples serve to illustrate the invention, but they are not intended to limit it thereto, the parts and percentages being by weight unless otherwise stated and the relationship of parts by weight to parts by volume being the same as that of the kilogram to the liter.

Example 1

10 parts of the monoazo-dyestuff, obtainable by diazotizing 3-amino-1-N-ethionylaminobenzene and coupling the diazo compound obtained with 1-hydroxynaphthalene-5-sulfonic acid are dissolved in the form of the potassium salt in 170 parts by volume of water. 30 parts by volume of dimethyl sulfate and dilute sodium hydroxide solution or dilute potassium hydroxide solution are slowly introduced at 45° C. to 50° C. into the vigorously stirred dyestuff solution. The speed with which the mixture is introduced is adjusted so as to maintain a pH-value of between 7.2 and 7.5. The mixture is after-stirred for 3 hours at 45° C. to 50° C., and, subsequently, potassium chloride is added. The product precipitated is separated by filtration at 20° C., washed with potassium chloride solution and dried in vacuo at 50° C. There is obtained a red powder which dissolves easily in water to give a red solution.

4 parts of the dyestuff obtained are mixed with 5 parts of urea, the mixture is dissolved in 41 parts of water and introduced in 50 parts of a sodium-alginate-thickening of 4% strength, while stirring. 3 parts of sodium bicarbonate are then added, and a cotton fabric is printed with the paste obtained. The fabric is dried and steamed for 5 minutes at 100° C. to 102° C. The material is then rinsed, soaped at boiling temperature, rinsed again and dried. There is obtained an intense red print possessing a good fastness to boiling.

When using instead of 4 parts of the methylated dyestuff the same quantity of the dyestuff used as starting material, there is obtained a dull print of merely very low intensity.

Example 2

31 parts of the dyestuff obtained by coupling diazotized 4-amino-1-N-ethionylaminobenzene with 1-hydroxynaphthalene-3,6-disulfonic acid are disolved at 40° C. in 250 parts by volume of water. For methylating, 50 parts by volume of dimethyl sulfate and saturated potassium bicarbonate and sodium carbonate solution are introduced simultaneously at said temperature within 1 hour, while vigorously stirring, so as to maintain a pH-value of between 7.0 and 7.4. The mixture is after-stirred for 2 hours at 40° C. The methylation is complete when a drop test on filter paper with 2 N-soda solution does not show any change of color to violet. The product is salted out at 5° C. with potassium chloride, separated by filtration and dried in vacuo at 60° C. The dyestuff containing in the dyestuff molecule an N-methyl-N-ethionylamino group, is obtained in the form of a red brown powder which dissolves easily in water to give a red solution. According to the printing directions for cotton given in Example 1, the product—contrary to the dyestuff used as starting material—yields an intimate clear scarlet print, the color of which does not change to violet when dropping dilute soda solution on it.

Example 3

10 parts of the dyestuff prepared by coupling diazotized 4-amino-1-N - vinylsulfonylaminobenzene with 7-acetylamino-1-hydroxynaphthalene-3-sulfonic acid are dissolved in the hot in 110 parts by volume of water. Diethyl sulfate and sodium hydroxide solution of 20% strength are added slowly at a temperature of between 60° and 70° C. and a pH value of between 7.5 and 8, while vigorously stirring, until the dyestuff used as starting material is completely ethylated. When the reaction is complete, the mixture is cooled down to 10° C., and potassium chloride is added. The dyestuff precipitated is isolated by filtration, washed with potassium chloride solution and dried in vacuo. When applying the so-called pad-batch-steaming process, in which sodium carbonate is used as acid-binding agent, and the material is steamed for 5 minutes at 100° C. to 120° C., the dyestuff obtained yields an intense scarlet dyeing possessing a very good fastness to washing.

Example 4

15 parts of the dyestuff used as starting material in Example 2 are dissolved at 90° C. in 150 parts by volume of water. 30 parts by volume of benzyl chloride and 2 N-sodium hydroxide solution are introduced within 1 hour at a temperature of between 90° C. and 95° C. and a pH-value of 8, while vigorously stirring. The mixture is after-stirred for 2 hours at the same temperature and at the same pH-value. When the reaction is complete, the mixture is distilled with steam and subsequently cooled down to room temperature. The benzylated product is salted out with potassium chloride, separated by filtration and dried at 60° C. The dyestuff possesses properties similar to those of the dyestuff described in Example 2.

Example 5

15 parts of the dyestuff obtained by diazotizing 4-amino-1-N-ethionylaminobenzene and coupling 8-acetylamino-1-hydroxynaphthalene-3,6-disulfonic acid are dissolved at 40° C. in 150 parts by volume of water. At this temperature, 30 parts by volume of dimethyl sulfate and 2 N-potassium bicarbonate solution are introduced within 1 hour into the quickly stirred dyestuff solution, so as to maintain a pH-value of between 7.0 and 7.1. The mixture is after-stirred for 2 hours at 40° C., cooled down to 5° C. and potassium chloride is added. The precipitation is separated by filtration, washed with potassium chloride solution and dried in vacuo at 50° C. There is obtained a red powder which dissolves easily in water to give a red solution. According to the printing directions given in Example 1, the dyestuff so obtained yields an intense, brilliant bluish red print, the color of which does not change to violet when dilute soda solution is dropped on it.

Example 6

21.3 parts of the dyestuff obtained by coupling diazotized 4-amino-1-(β-chloroethylsulfonylamino)-benzene with 1-hydroxynaphthalene-3,6-disulfonic acid are dissolved at 40° C. in 300 parts by volume of water. For methylating, 55 parts by volume of dimethylsulfate and saturated potassium bicarbonate solution are introduced simultaneously at said temperature with 1 hour, while vigorously stirring, so as to maintain a pH-value of between 7.0 and 7.4. The mixture is after-stirred for 3 hours at this pH-value and at said temperature. The methylation is complete when a drop test on filter paper with 2 N sodium carbonate does not show any change of color to violet. The mixture is adjusted to a weekly acid pH-value with diluted hydrochloric acid, and, subsequently, 20 percent of potassium chloride (calculated on the volume of the reaction mixture) is added. The product precipitated is filtered, washed with potassium chloride solution and dried in vacuo at 40° C. The dyestuff, containing a N-methyl-β-chloroethylsulfonylamino group, represents a reddish brown powder which easily dissolves in water to give a red solution. The dyestuff possesses properties similar to those of the dyestuff described in Example 2.

The following table contains further dyestuffs used as starting material which can be transformed according to the process of the present invention with the corresponding alkylating agents specified beside into the novel dyestuffs which are correspondingly alkyl-substituted at the nitrogen atom of the ethionylamino group. The last column contains the prints obtained with the alkylated starting dyestuffs on dyeing or printing cellulosic fabrics in the presence of an acid-binding agent.

| Number | Dyestuff used as starting material | Alkylating agent | Tint on cotton |
|---|---|---|---|
| 1 | (structure with SO₂—CH₂—CH₂—O—SO₃H, NH, Cl, N=N, OH, HO₃S, NH—CO—CH₃) | Dimethyl sulfate | Orange red. |
| 2 | (structure with HN—SO₂—CH₂—CH₂—O—SO₃H, N=N, OH, HO₃S, NH—CH₃) | do | Brown. |
| 3 | (structure with CH₂—CH₂—O—SO₃H, N=N, HO₃S, OH, NH—CO—CH₃, SO₃H) | do | Red. |
| 4 | (structure with CH₃, NH, N=N, OH, HO₃S, NH—CO—CH₃, SO₂—CH₂—CH₂—O—SO₃H) | do | Orange red. |

| Number | Dyestuff used as starting material | Alkylating agent | Tint on cotton |
|---|---|---|---|
| 5 | | Dimethyl sulfate | Bluish red. |
| 6 | | do | Orange. |
| 7 | | Diethyl sulfate | Red. |
| 8 | | do | Scarlet. |
| 9 | | Dimethyl sulfate | Do. |
| 10 | | do | Red. |
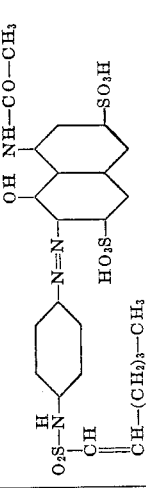

| Number | Dyestuff used as starting material | Alkylating agent | Tint on cotton |
|---|---|---|---|
| 11 | (structure with COOH, OH, N=N, HO₃S, NH—SO₂—CH₂—CH₂—O—SO₃H) | Dimethyl sulfate | Orange. |
| 12 | (structure with OH, N=N, HO₃S, HO₃S, NH—SO₂—CH₂—CH₂—O—SO₃H) | do | Do. |
| 13 | (structure with OH, N=N, HO₃S, HO₃S, NH—SO₂—CH₂—CH₂—O—SO₃H) | do | Do. |
| 14 | (structure with CO—CH₃, N=N—CH—CO—NH, SO₃H, SO₃H, H N—SO₂—CH₂—CH₂—O—SO₃H) | do | Yellow. |
| 15 | (structure with OH, N=N, HC₃S, CH₃O, SO₃H O—CH₂—CH₂—SO₂—NH) | do | Orange. |
| 16 | (structure with OH, SO₃H, N=N, HO₃S, CH₃, CH₃, SO₃H O—CH₂—CH₂—SO₂—NH) | do | Scarlet. |
| 17 | (structure with OH NH—CO—CH₃, SO₃H, N=N, HO₃S, CF₃, SO₃H O—CH₂—CH₂—SO₂—NH) | do | Red. |

| Number | Dyestuff used as starting material | Alkylating agent | Tint on cotton |
|---|---|---|---|
| 18 | (structure) | Dimethyl sulfate | Orange. |
| 19 | (structure) | do | Scarlet. |
| 20 | (structure) | do | Do. |
| 21 | (structure) | do | Orange. |
| 22 | (structure) | do | Yellow. |
| 23 | (structure) | do | Orange. |

| Number | Dyestuff used as starting material | Alkylating agent | Tint on cotton |
|---|---|---|---|
| 24 | HO₃S–⬡–N=N–⬡(NH₂)(SO₃H)–⬡–NH–SO₂–CH₂–CH₂–Cl | Dimethyl sulfate | Orange |
| 25 | HO₃S–⬡(OH)–N=N–⬡(SO₃H)–CO–NH–⬡–N(H)–SO₂–CH₂–CH₂–O–SO₃H | do. | Scarlet |
| 26 | CH₃–CO–NH–⬡(OH)(SO₃H)–N=N–⬡(SO₃H)–SO₂–NH–⬡–N(H)–SO₂–CH₂–CH₂–O–SO₃H | do. | Red |
| 27 | HO₃S–⬡(OH)–N=N–⬡(SO₃H)–CO–NH–⬡–NH–SO₂–CH₂–CH₂–Cl | do. | Scarlet |
| 28 | HO₃S–⬡(OH)–N=N–⬡(SO₃H)–SO₂–NH–⬡–NH–SO₂–CH₂–CH₂–Cl | do. | Orange |
| 29 | CH₃–CO–NH–⬡(OH)(SO₃H)–N=N–⬡(SO₃H)–CO–NH–⬡–NH–SO₂–CH=CH₂ | do. | Red |
| 30 | HO₃S–O–CH₂–CH₂–SO₂–HN–⬡–N=N–⬡(OH)(SO₃H)–SO₂–NH–⬡–NH–SO₂–CH=CH₂ | do. | Orange |

| Number | Dyestuff used as starting material | Alkylating agent | Tint on cotton |
|---|---|---|---|
| 31 |  SO₃H, OH, OCH₃, —N=N—, SO₂—HN— 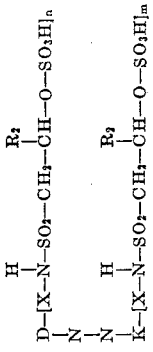—NH—SO₂—CH₂—CH₂—O—SO₃H | Dimethyl sulfate | Red. |
| 32 | SO₃H, OH, OCH₃, —N=N—, SO₂—NH— —NH—SO₂—CH=CH₂ | do | Red. |
| 33 | SO₃H, OH, OCH₃, —N=N—, SO₂—HN— —NH—SO₂—CH₂—CH₂—Cl | do | Red. |

We claim:
1. A process for preparing monoazo-dyestuffs having in the form of a free-acid a formula of the group consisting of

$$D-[X-N(R_1)-SO_2-CH_2-CH-R_2-O-SO_3H]_n$$
$$-N=N-$$
$$K-[X-N(R_1)-SO_2-CH_2-CH-R_2-O-SO_3H]_m$$

and $$D-[X-N(R_1)-SO_2-CH_2-CH-R_2-Cl]_n$$
$$-N=N-$$
$$K-[X-N(R_1)-SO_2-CH_2-CH-R_2-Cl]_m$$

wherein D represents phenyl, chlorophenyl, lower alkyl phenyl, dilower alkyl phenyl, lower alkoxy phenyl, lower alkoxy sulfophenyl, trifluoromethyl phenyl, carboxyphenyl, sulfophenyl, disulfophenyl, acetylamino sulfophenyl, naphthyl, disulfohydroxyethyl or sulfodiphenylether; K represents hydroxynaphthyl, sulfohydroxynaphthyl, disulfohydroxynaphthyl, disulfoamino naphthyl, acetylamino hydroxynaphthyl, acetylamino sulfohydroxynaphthyl, acetylamino disulfohydroxynaphthyl, lower alkylamino hydroxynaphthyl, acetoacetylaminophenyl or 1-chlorosulfophenyl-lower alkyl-5-pyrazolone. X represents a member of the group consisting of a direct linkage, —CO—NH— 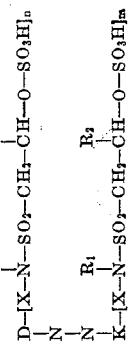 and —SO₂—NH— 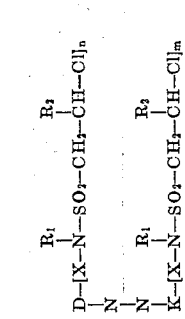

R₁ represents a member of the group consisting of lower alkyl and benzyl, R₂ represents a member of the group consisting of hydrogen and lower alkyl, n and m stand for an integer from 0 to 2, and n+m being from 1 to 2, which comprises reacting monoazo-dyestuffs having a formula of the group consisting of $$D-[X-N(H)-SO_2-CH_2-CH-R_2-O-SO_3H]_n$$
$$-N=N-$$
$$K-[X-N(H)-SO_2-CH_2-CH-R_2-O-SO_3H]_m$$

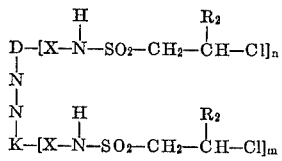

and

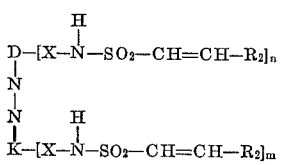

in which D, K, X, R$_2$ and $n$ and $m$ are as defined above, with an alkylating agent in aqueous medium in the presence of an acid-binding agent at a temperature in the range of from about 30° C. to about 130° C.

2. The process as claimed in claim 1, wherein a member of the group consisting of methyl bromide, ethyl bromide, benzyl chloride, dimethyl sulfate and diethyl sulfate is used as an alkylating agent.

3. The process as claimed in claim 1, wherein sodium hydroxide, potassium hydroxide, sodium carbonate, potassium carbonate, sodium hydrogen carbonate and potassium hydrogen carbonate is used as an acid-binding agent.

References Cited

UNITED STATES PATENTS

| | | | |
|---|---|---|---|
| 2,349,749 | 5/1944 | Paul | 260—556 X |
| 3,124,610 | 3/1964 | Larsen | 260—556 X |
| 3,133,086 | 5/1964 | Bossard et al. | 260—556 X |
| 3,234,257 | 2/1966 | Kühne | 260—205 X |

CHARLES B. PARKER, *Primary Examiner.*

D. M. PAPUGA, *Assistant Examiner.*

U.S. Cl. X.R.

8—41, 51, 54.2, 55; 260—163, 193, 194, 197, 198, 199, 200, 201, 204, 556